United States Patent [19]

Efferding

[11] Patent Number: 5,023,042

[45] Date of Patent: Jun. 11, 1991

[54] FLEXIBLE MOLD FOR MAKING SEAMLESS SAILBOARDS

[76] Inventor: Gary Efferding, P.O. Box 2562, Dunedin, Fla. 34697

[21] Appl. No.: 373,832

[22] Filed: Jun. 29, 1989

[51] Int. Cl.[5] .................... B29C 33/50; B29C 65/02; B29C 31/30
[52] U.S. Cl. .................. 264/511; 264/45.2; 264/554; 264/571; 264/258; 264/313; 264/321; 264/102; 264/334; 264/DIG. 78; 425/501; 425/504; 425/388; 425/390; 425/440; 425/DIG. 19; 156/286; 441/74
[58] Field of Search ............... 264/510, 511, 544, 553, 264/571, 313, 321, 102, 257, 259, 258, 334, 45.2, 554, DIG. 78; 156/285, 286, 309.9, 382, 102; 425/440, DIG. 44, 501, 504, 388, 390, DIG. 19; 249/127; 114/39.2; 441/68, 74

[56] References Cited

U.S. PATENT DOCUMENTS

| | | | |
|---|---|---|---|
| 3,353,220 | 11/1967 | Lenoble | 264/511 |
| 3,520,961 | 7/1970 | Suda et al. | 425/440 |
| 3,781,155 | 12/1973 | Wiltshire | 425/392 |
| 3,818,823 | 6/1974 | Bond | 156/285 |
| 4,027,845 | 6/1977 | Putzer | 264/313 |
| 4,152,188 | 5/1979 | Friedrich et al. | 156/102 |
| 4,222,808 | 9/1980 | Hale et al. | 264/313 |
| 4,255,221 | 3/1981 | Young | 264/571 |
| 4,383,955 | 5/1983 | Rubio et al. | 264/46.6 |
| 4,450,034 | 5/1984 | Stein | 156/285 |
| 4,504,341 | 3/1985 | Radzwill | 156/285 |
| 4,556,003 | 12/1985 | Prade | 114/39.2 |
| 4,802,839 | 2/1989 | Hidawa | 249/127 |
| 4,806,302 | 2/1989 | Frank | 264/511 |
| 4,822,549 | 4/1989 | Verwilst et al. | 264/313 |

FOREIGN PATENT DOCUMENTS

| | | | |
|---|---|---|---|
| 236569 | 8/1960 | Australia | 264/304 |
| 3201786 | 7/1983 | Fed. Rep. of Germany | 264/135 |
| 62-198411 | 9/1987 | Japan | 264/313 |
| 585074 | 12/1977 | U.S.S.R. | 264/313 |

*Primary Examiner*—Jeffery Thurlow
*Assistant Examiner*—Mathieu Vargot
*Attorney, Agent, or Firm*—Joseph C. Mason, Jr.; Ronald E. Smith

[57] ABSTRACT

Sailboards having a tucked rail are made from a flexible, resilient mold so that the seam of the board is along its bottom edge instead of at its point of greatest breadth. A flexible mold part having the contour of the sailboard to be produced has an opening smaller than the greatest breadth of the board. The mold is first flexed so that its opening is sufficiently wide to receive the blank that forms the body of the sailboard. Secondly, the blank is inserted into the flexed mold, and thirdly, the mold is released and its resiliency returns it to its original shape. A conventional rigid mold part closes the open end, and a vacuum is applied to form the final product. The flexible mold part is flexed a second time to remove the product.

2 Claims, 2 Drawing Sheets

Fig_1

FLEXIBLE MOLD FOR MAKING SEAMLESS SAILBOARDS

TECHNICAL FIELD

This invention relates, generally, to molds for making articles of manufacture. More particularly, it relates to a two part mold having a flexible and resilient mold part having an internal breadth greater than its opening and a rigid mold part that closes the opening.

BACKGROUND ART

Rigid molds have long been used for making miscellaneous items. Typically, molds have a top part and a bottom part that maintain the flowable material to be molded into a particular shape in sandwiched relation therebetween. Accordingly, a seam is produced in the final product where the top and bottom mold parts come together.

Where an item to be produced has its greatest breadth at a region other than its top or bottom, the mold parts must be made so that the parting line between them coincides with that maximum breadth.

Although the present invention is not restricted to molds that produce sailboards (used in windsurfing) or surfboards, it was developed in that art as were many other developments in the mold making arts. For example, U.S. Pat. No. 4,255,221 to Young shows a pressure forming apparatus for making a surfboard. A sailboard manufacturing process is shown in U.S. Pat. No. 4,556,003 to Prade. A process for manufacturing a foam-filled article such as a surfboard is shown in U.S. Pat. No. 4,383,955 to Rubio et al. Surfboards and sailboards can also be made following the teachings and suggestions of U.S. Pat. Nos. 4,551,290 to Mizell and 4,173,032 to Frank.

While all of the known sailboard and surfboard making techniques produce articles having utility, there are a number of limitations in the art. One of the most important limitations involves time; it takes between thirty to forty-five hours to manufacture a professionally acceptable sailboard, for example. The known techniques also produce sailboards having a seam at the widest part thereof, i.e., due to the limitations of the rigid molds of the prior art, the production of a sailboard having no seam has been unattainable.

To manufacture a sailboard by following prior art techniques developed by the present inventor, a styrofoam blank having the general shape of a sailboard is employed as the starting material. The top of the styrofoam is cut away to form a recess; fiberglass saturated with epoxy is applied to the recess and a PVC foam inlay is inserted thereinto. The inlay is called the deck of the sailboard, because the windsurfer stands on the deck when windsurfing. Another layer of PVC foam is applied to the bottom of the styrofoam blank after first applying a layer of fiberglass saturated with epoxy to the bottom of the blank.

The PVC foam top and bottom pieces are held in place with brads or nails and the blank/PVC form assembly is placed in an air-tight bag. Weights are applied to the PVC foam pieces, the bag is vacuumed to the blank for a couple of hours, and the assembly is oven cured for three hours.

This vacuum bag technique creates flaws in the fiber orientation, due to the wrinkles that are formed by the bag. Since the fibers may be skewed by the wrinkles in the plastic, the boards produced by the above-described technique are flawed. Thus, not only are the techniques of the prior art very time consuming, the resulting sailboard has a seam at its greatest breadth and may have structural flaws as well due to the effects of the wrinkled plastic. Moreover, the low vacuums attainable by the above-described technique limit the strength of the sailboards produced thereby.

DISCLOSURE OF INVENTION

A sailboard having a tucked rail and a flat bottom is produced by a mold where the entire volume of the board is housed by a single mold part. The single mold part is flexible, has an open end smaller in breadth than the breadth of the internal cavity means defined by the mold, and has a flat, outwardly extending flange means along the entire extent of its open end. A flat, rigid mold part of conventional construction closes the open end of the flexible mold part, tightly abuttingly engages the flat bottom of the item to be produced, and tightly abuttingly engages the peripheral flanges of the flexible mold part as well when a vacuum is applied to the assembly in the manner set forth in the detailed description that follows. A vacuum is also created in the interior of the flexible mold part during the molding process to enhance the bonding of the parts being formed in the mold.

The flexible mold part is formed of a resilient material so that it returns to its original shape after it has been flexed.

The breadth of the opening of the flexible mold part is less than the breadth of its interior as aforesaid. Thus, to produce a flat-bottomed item having a breadth greater than the breadth of said flat bottom, the flexible mold is flexed to increase the size of its open end and the materials to be molded are introduced to the mold cavity through said widened open end. The mold is then released and it returns to its original shape due to its resiliency. The flat, rigid mold part is then employed to close the open end, a vacuum bag is applied and the molding process then begins. Upon completion of the process, the vacuum bag is removed and the flexible mold part is again flexed so that the final product can be removed from the mold. The seam of the product will thus be along the flat bottom of the item and not at the greatest breadth of the final product.

Many of the time consuming steps of the prior art are substantially eliminated in the novel manufacturing process depicted in the Figures. The novel process accomplishes most of the steps of the prior art in only three man hours and enables a complete sailboard to be produced in about eight man hours. For example, the steps of final painting and sanding are completely eliminated by the inventive technique disclosed herein.

Since the novel mold part is flexible, it will not crush or distort the expanded polystyrene styrofoam blank even when it is subjected to an almost perfect vacuum for a predetermined amount of time. Heretofore, with the use of rigid molds, vacuums were limited to 12–15 inches of Hg to avoid blank crushing; a board formed under an almost perfect vacuum has a structural integrity that substantially exceeds the structural integrity of a board formed only under 12–15 inches of Hg. The novel board is lighter than earlier boards as well. The increased pressure also insures that no appreciable flaws in the fibers will exist in the completed board, unlike the wrinkle-originated flaws that appear in the prior art boards formed by the above-mentioned vacuum bag techniques.

An important object of this invention is to produce molded items having maximum structural integrity.

Another major object is to pioneer the art of flexible, resilient mold parts.

A more particular object is to provide a mold capable of producing an article of manufacture having a breadth greater than the opening of the mold.

A specific object is to produce a sailboard having a seam along its bottom edge.

The invention accordingly comprises the features of construction, combination of elements and arrangement of parts that will be exemplified in the construction set forth hereinafter and the scope of the invention will be set forth in the claims.

DESCRIPTION OF THE DRAWINGS

For a fuller understanding of the nature and objects of the invention, reference should be made to the following detailed description, taken in connection with the accompanying drawings, in which.

BEST MODES FOR CARRYING OUT THE INVENTION

Figure 1:
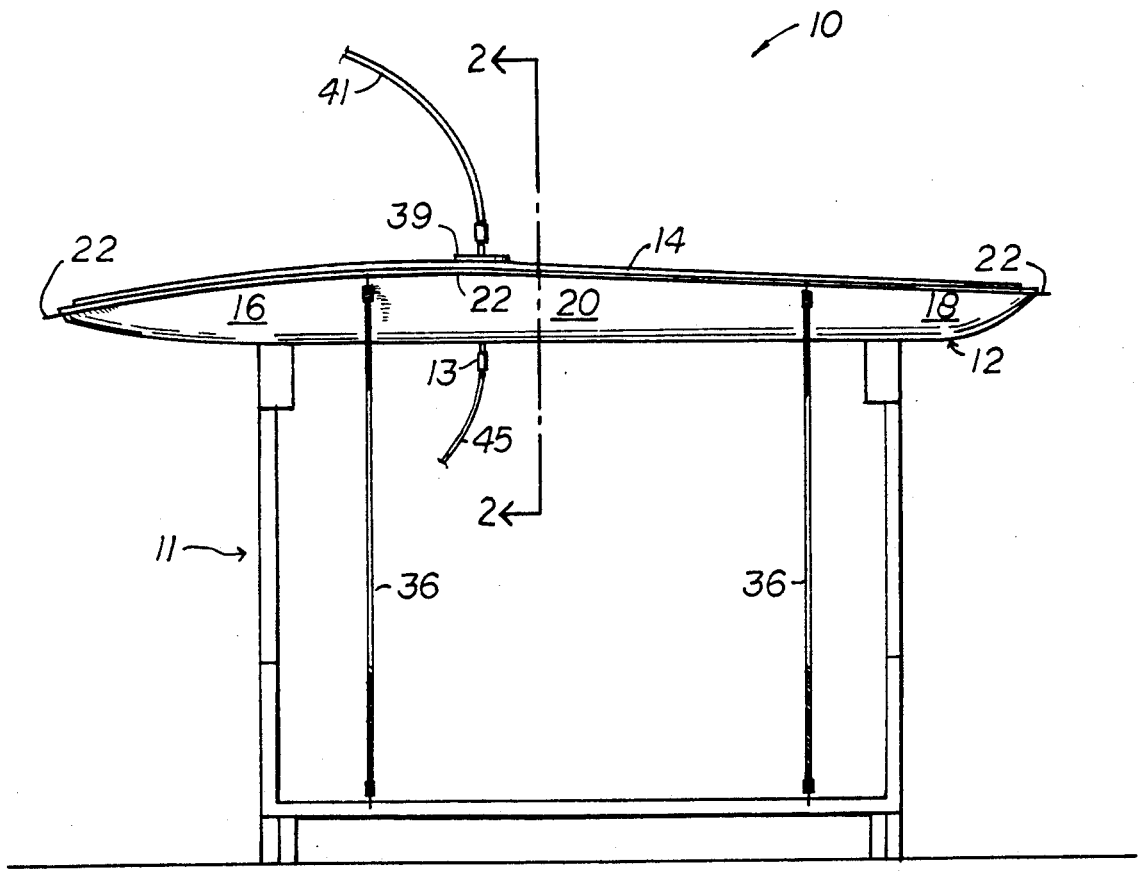
FIG. 1 is a side elevational view of the novel mold shown supported on a stand.

In the Figs., the reference numeral 10 denotes the novel mold parts as a whole. More particularly, the top or flexible and resilient mold part is denoted 12 and the lower, rigid mold part is denoted 14. A stand for supporting pressure former 10 is denoted 11 as a whole.

Flexible mold part 12 has a forward end 16, a rearward end 18 and a medial part 20 therebetween. A nozzle means 13 is fixedly secured to flexible mold part 12, about mid-length thereof, before the manufacturing process begins. However, at this stage of the process, mold part 12 is imperforate and nozzle 13 is merely attached thereto in non-penetrating relation thereto.

A flat peripheral flange member 22 circumscribes the flexible and resilient part 12 and projects laterally outwardly from the open or top end 24 thereof as shown.

An internal cavity means 26 is defined by the inner walls of mold part 12. Importantly, the greatest breadth of the cavity means 26 is not at the open end 24 of the mold part, but is spaced therefrom. An imaginary plane 28 is depicted in FIG. 2 to indicate the greatest breadth of the internal cavity means 26, said plane clearly being remote from open end 24.

Figure 2:
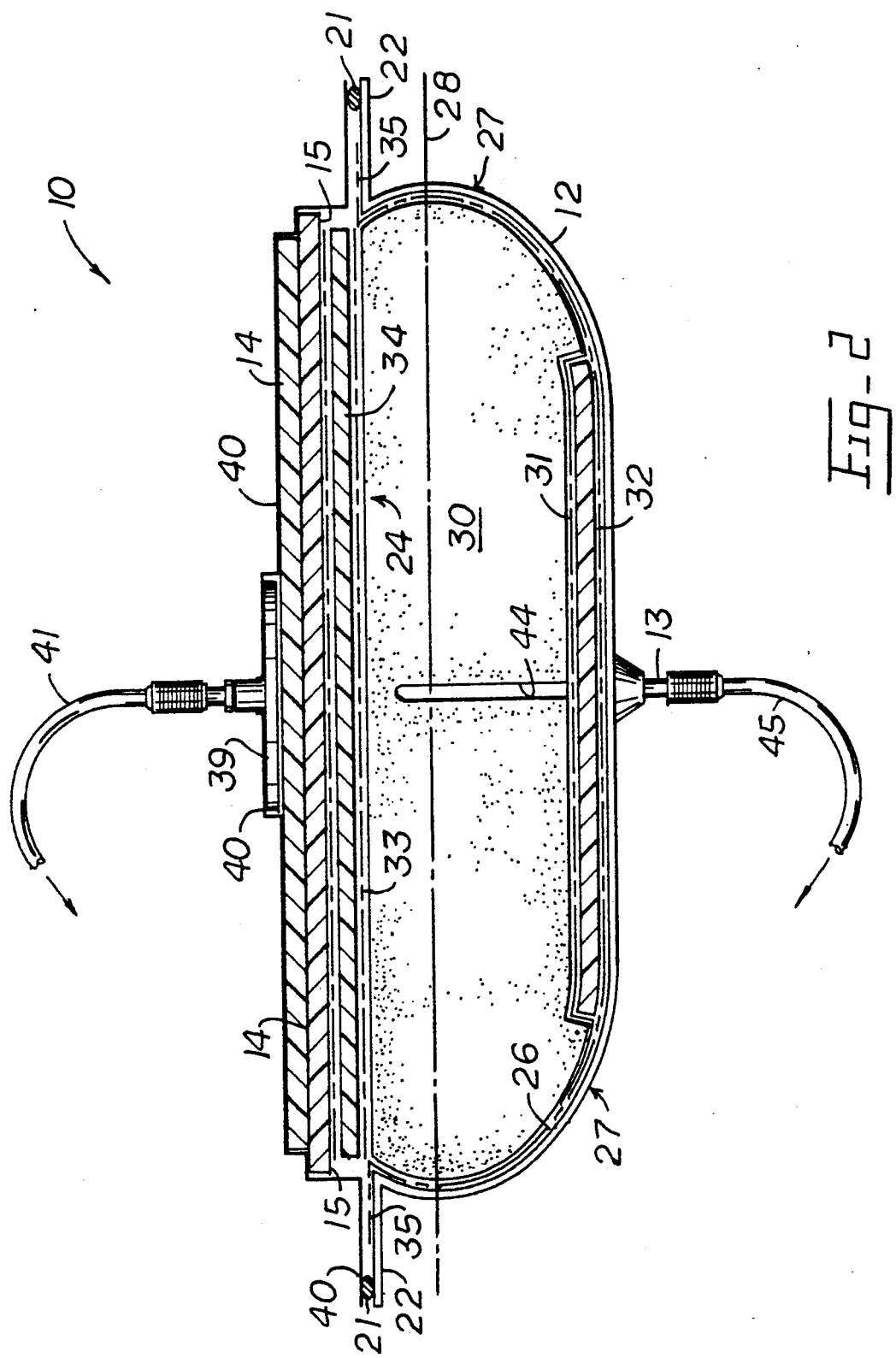
FIG. 2 is a transverse sectional view taken along line 2—2 in FIG. 1.

Blank 30, formed of expanded polystyrene (EPS) styrofoam, deck inlay 32 and bottom inlay 34 are shown positioned within internal cavity means 26 in FIG. 2. Both inlays are formed of PVC foam.

It should be noted from an inspection of FIG. 2 that the novel sailboard has an I-beam type construction. Specifically, the EPS styrofoam that forms blank 30 is disposed in sandwiched relation between top inlay or deck 32 and the bottom inlay 34. Due to the elongate structure of the board, varying tension and compression stresses will appear along its extent.

The blank 30 is preferably manufactured so that a deck-receiving recess is formed therein to facilitate the positioning of deck inlay 32. However, before the deck inlay is positioned within its recess, fiberglass and resin are first applied therebetween. The fiberglass between deck inlay 32 and the blank recess is denoted 31 in FIG. 2.

Fiberglass and resin (33 in FIG. 2) are also applied between the flat bottom of blank 30 and bottom inlay 34.

Bungy cords, collectively denoted 36 in FIG. 1, maintain the mold parts 12 and 14 on frame 38 during the vacuuming process (their top ends engage flange 22 and their bottom ends engage stand 11); the cords may also be used to hold mold part 12 open when the styrofoam blank 30 is introduced thereinto. However, it has been found that the bungy cords are not needed to hold it open if mold part 12 is prestressed.

When the mold part 12 is held open, the breadth of its open end 24 is slightly greater than the greatest breadth 28 of the internal cavity means 26 so that blank 30 can be introduced into said cavity means 26. After the introduction of the blank into the internal cavity means has been carefully accomplished, the mold part 12 is allowed to substantially resume its unflexed configuration. Mold part 12 is resilient because it is formed of composite materials.

Before the blank/inlay assembly is introduced into flexible mold part 12, several layers of fiberglass are placed into overlying relation to said flexible mold part 12. Importantly, the peripheral edges of the fiberglass that lines part 12 extend upwardly beyond flange 22. Such excess fiberglass is bent outwardly into overlying relation to flange 22 as indicated by reference numeral 35 in FIG. 2, and taped thereto with masking tape before the blank/inlay assembly is introduced into mold part 12. This folded over fiberglass 35 serves to seal the space between the flange 22 and the rigid mold part 14, i.e., the folded over fiberglass 35 becomes an important part of the seam in the final product and is not trimmed until the blank and inlay assembly has been removed from the mold at the end of the manufacturing process.

After blank 30 has been positioned in said cavity means, rigid mold 14 is brought into closing relation to open end 24 as shown in FIG. 2. Mold part 14 will overhang flange 22 as at 15; thus, the flange serves as a limiting means that ensures that blank 30 will not be crushed by rigid mold part 14.

A receptacle member 39 having plural inlets or air passageways is next placed into overlying relation to rigid part 14.

Plastic vacuum bag 40 is then positioned into overlying relation to rigid mold part 14 and receptacle 39 and the edges of the plastic vacuum bag are brought into overlying relation relative to peripheral flange 22 and said edges are taped thereto with Butyl tape 21, preferably.

A vacuum line 41 is brought into fluid communication with receptacle 39; the puncture is presealed with Butyl tape. A vacuum motor, not shown, is then started and air is drawn from the space surrounded by the vacuum bag 40 through the inlets formed in receptacle 39, thereby drawing rigid mold part 14 and flexible mold part 12 together and thereby applying molding pressure to the expanded polystyrene blank 30 and the PVC foam inlays 32, 34.

Air is preferably drawn from bag 40 by a 1.5 horsepower vane pump confluent with vacuum line 41. A control valve, not shown, is opened slowly to insure a relatively slow withdrawal of air from bag 40 so that mold parts 12 and 14 draw toward one another at a relatively slow rate. When drawn together, the outermost peripheral border 15 of rigid mold part 14 will overlie flange 22 as aforesaid; the amount of overlap is about one-half inch.

The rate of air withdrawal is preselected so that the top and bottom mold parts 12 and 14 draw substantially together in about 10 seconds. The valve is then opened further and the vacuum is increased to about 27 inches Hg and said level of vacuum is maintained for about a minute.

A breather hole or bore 44 is then drilled through flexible mold part 12 and into blank 30, said bore being aligned with nozzle 13 (the drill bit is inserted through the nozzle), and the bore is continued deep into the blank 30 as illustrated in FIG. 2.

A second vacuum line 45 is then opened up, and the vacuum is brought to about 21 inches of Hg. Air in the interstitial spaces of the EPS styrofoam will be drawn into bore 44 and discharged into the atmosphere. Thus, blank 30 is more easily compressed and molded.

The mold and its contents are then baked at about one hundred degrees Fahrenheit for a couple of hours. Both vacuums are monitored about every fifteen minutes and adjusted as needed.

The mold and its contents are then allowed to cool for about thirty minutes. When the assembly is sufficiently cool, the vacuum sources and the vacuum bag are removed.

The product is pulled from the flexible mold and its seam and fin box are immediately trimmed while the laminate glass is still soft. The product is then waxed and prepared for gelling later in the day. The final steps of prior art sailboard manufacture, such as filling, sanding, filling, sanding, painting, wet sanding and final painting, which steps consume about four man hours, are completely eliminated because the high vacuum achieved in the novel process produces a board that does not require such finish. High vacuums are not achievable where prior art rigid molds are used because after the vacuum exceeds 12-15 inches of Hg, the styrofoam blank begins to distort. The novel flexible mold 12, however, applies equal pressure to all parts of the blank 30 and thus no distortion appears even when the high vacuums disclosed herein are reached.

Moreover, since the strength of a board is dependent upon its fiber content and not its resin content, the closely packed fibers in the final sailboard provide a much stronger yet lighter board than the rigid molds of the prior art can produce. Just as importantly, the fibers will be in common alignment, unlike the prior art boards where the fibers are misaligned due to the aforementioned wrinkling of plastic.

It is critical to observe in FIG. 2 that the only seam that will appear in the final sailboard will be coincident with the bottom peripheral edge thereof, because that is where the flexible and rigid mold parts meet. The seams of sailboards of the prior art appear along imaginary plane 28.

Thus, in traversing a transverse cross section of the final sail board, from top to bottom, one first encounters a thin layer of gel coat, one or more layers of fiberglass, the PVC foam deck inlay, one or more layers of fiberglass, the EPS styrofoam blank, more layers of fiberglass, the PVC foam bottom inlay, further layers of fiberglass, and a thin layer of gel coat.

Those skilled in the art of working with fiberglass will be able to make and use the invention from the above description. However, additional details of the novel manufacturing process will now be set forth to even more fully describe the invention.

A hot wired or molded blank is used as the starting material and the skills of a professional fitter are required. However, a pre-molded blank having a recess to accept the deck inlay and being otherwise dimensioned and configured is the preferred starting material. Specifically, it has been found that the starting blank of EPS styrofoam should be about three sixteenths of an inch larger than the final desired product, i.e., the novel mold will compress the blank about three sixteenths of an inch.

The novel sailboard manufacturing process includes the precutting and gluing of the PVC foam sheets that will form the deck inlay and the bottom inlay. The inserts and the fin box are also preapplied so that the fitter need only to fit the PVC foam sheets to the blank. The sheets are temporarily held onto the top and bottom of the blank with nails, and an opening is cut into the blank to accommodate the fin box.

Another preparatory step includes cutting the top and bottom PVC foam inlays to the desired shape by using templates. Templates are also employed to mark the inserts and the fin box area; the marked areas are then cut out to accommodate the inserts and the fin box. The end of the PVC foam inlays, the fin box and the inserts are glued up at the same time and the work is stored for further preparatory work by the fitter.

The night before the blank is introduced into the novel mold, the mold surfaces are waxed and buffed and are sprayed with a very thin layer of standard white gel coat, which coat becomes the outer glossy, smooth, white surface of the completed board.

Having allowed the gel coat to cure overnight, a six ounce fiberglass cloth is rolled out; one layer is placed on the rigid bottom mold, and three layers are placed in the flexible upper mold.

The flexible mold part is positioned on a stand 11 specifically designed to hold it, open end up, as shown in FIG. 1, and bungy cords or other suitable bias means secured to the flange of the mold are used to open the open end of the part to its maximum breadth, unless a prestressed mold is used. Prestressed molds do not require bungy cords or other means for opening them.

Simultaneously, a layer of plastic is placed on a laminating table and fiberglass that underlies the top and bottom PVC foam inlays is rolled out, and the laminating process is performed. One person applies resin to the fiberglass and the mold and a second person does the same to the blank and the PVC foam simultaneously. The mold is hand laminated with a 3:1 epoxy in a conventional manner. Small heel patches are applied to the flexible mold part where the greatest stresses will appear when the sailboard is in use. The fiberglass 35 protruding upwardly from the edge of the flexible mold is bent into overlying relation to the flange 22 and is taped thereto. A Q-cell 3:1 epoxy glue is applied to the flange-abutting edge of the rigid mold; this material glues and seals the final seam. The same mixture is used to fill the ends of the mold as well.

The fitter, in the meantime, laminates the fiberglass on the table; he or she positions the precut PVC top and bottom inlays into overlying relation to the fiberglass and cuts out the glass and the plastic, using the PVC foam as a template. Next, the precut fiberglass is placed, fiber side down, on the blank. The plastic reduces friction so that the fitter can slide the fiberglass around until it fits into the inlay of the deck or the bottom inlay.

The plastic is then pulled out and the fiberglass is positioned securely in the inlay with a squeegee. The deck PVC foam is placed into overlying relation to the fiberglass and held in place by brads or nails at the premarked location. The blank is then flipped over and the bottom PVC foam and fiberglass is placed on the blank in the same way.

The final preparatory step is the gluing of the fin box area to the foam and through to the deck. The blank is then flipped back over and the brad holes, insert areas and ends are filled with Q-cell mix.

Having thus prepared the blank and the top and bottom inserts, the assembly is ready for insertion into the novel flexible mold. The flexible mold part is held by bungy cords, preferably, unless a prestressed flexible mold is used. Two workers, standing at opposite ends of the assembly, place the assembly in the flexible mold part, upside down. The fitter sets the rear end of the assembly in first and the forward end is thereafter carefully placed in the mold while the assembly is held level. While the fitter is checking the fit of the blank in the mold, the helper applies Q-cell to the exposed bottom surfaces of the PVC foam over the brad holes and around the fin box.

Both workers then close the open end of the flexible mold with the rigid bottom part of the mold, and the vacuum bag is positioned and the vacuum is applied and the final product is produced as earlier described.

In this manner, work which once required thirty to forty-five man hours now takes about eight man hours, and the actual pressure forming procedure takes less than three hours. The resulting board is lighter in weight than the boards of the prior art, yet is stronger. Seamless sailboards having tucked rails (a "tucked rail" refers to overhang 27) were heretofore unknown. (The amount of tuck varies along the length of the sailboard, and usually is greatest about mid-length thereof.)

Clearly, this invention pioneers the art of seamless, tucked rail sailboards and methods for making them. Accordingly, the claims appended hereto are entitled to broad interpretation, as a matter of law, to protect the heart or essence of this important invention.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,
What is claimed is:

1. A method of producing a seamless sailboard from a blank that is pervious to air, comprising the steps of:
   providing a flexible and resilient mold part having an internal cavity means of predetermined breadth and configuration and having an open end of less breadth than the breadth of said internal cavity means;
   providing a flat, laterally extending flange means about the peripheral border of said open end;
   increasing the breadth of said open end by flexing said mold part;
   introducing said blank into said internal cavity means;
   releasing said mold part so that it substantially returns to its original position, said open end thereby substantially returning to its original breadth;
   closing said open end with a rigid mold part;
   drawing said flexible mold part and said rigid mold part together by creating a vacuum around said flange means and said rigid mold part;
   withdrawing air from the blank, thereby creating a vacuum extending into the interstitial spaces of the blank;
   after the passage of a predetermined amount of time, opening said open end by removing said rigid mold part therefrom;
   again flexing said flexible mold part to increase the breadth of its open end; and
   removing the seamless sailboard from said internal cavity means.

2. A mold means for making a seamless sailboard from a blank that is pervious to air, said mold means of the type having a flexible mold part having an open end and an internal cavity means, said internal cavity means being defined by inner side walls of said mold part comprising:
   said flexible mold part having an open end of breadth smaller than the breadth of said internal cavity means and said flexible mold part having sufficient resiliency to return to its original shape upon flexing;
   a flat flange means circumscribing said open end and said flange means projecting laterally outwardly therefrom;
   a rigid mold part that abuttingly engages said flange means, said rigid mold part closing said open end;
   first exhaust means for forming a vacuum that draws together said flexible mold part and said rigid mold part;
   said first exhaust means for forming said vacuum including a flexible sheet of imperforate material that overlies the rigid mold part, said flexible sheet being secured about its periphery to said flange means;
   second exhaust means for removing air from said internal cavity means, including a bore formed in said flexible mold part in fluid communication with a source of negative pressure.

* * * * *